US012220801B2

(12) United States Patent
Plank et al.

(10) Patent No.: US 12,220,801 B2
(45) **Date of Patent: *Feb. 11, 2025**

(54) IMPACT MECHANISM ARRANGEMENT

(71) Applicant: Hilti Aktiengesellschaft, Schaan (LI)

(72) Inventors: Uto Plank, Freising (DE); Ulrich Mandel, Buchloe Honsolgen (DE); Josef Fünfer, Koenigsbrunn (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 17/768,381

(22) PCT Filed: Nov. 2, 2020

(86) PCT No.: PCT/EP2020/080640

§ 371 (c)(1),
(2) Date: Apr. 12, 2022

(87) PCT Pub. No.: WO2021/094117

PCT Pub. Date: May 20, 2021

(65) Prior Publication Data

US 2024/0123589 A1 Apr. 18, 2024

(30) Foreign Application Priority Data

Nov. 12, 2019 (EP) .................................... 19208476

(51) Int. Cl.
*B25D 17/06* (2006.01)

(52) U.S. Cl.
CPC .......... *B25D 17/06* (2013.01); *B25D 2222/57* (2013.01); *B25D 2250/131* (2013.01)

(58) Field of Classification Search
CPC ................ B25D 17/06; B25D 2222/57; B25D 2250/131
USPC ........ 173/197, 81, 90, 140–141, 162.1, 198, 173/213, 168–171
See application file for complete search history.

(56) References Cited

U.S. PATENT DOCUMENTS

| | | | | |
|---|---|---|---|---|
| 2,685,274 | A | 8/1954 | Liddicoat | |
| 4,476,941 | A | 10/1984 | Buck et al. | |
| 6,732,815 | B2 * | 5/2004 | Hanke .................... | B25D 17/20 173/210 |

(Continued)

FOREIGN PATENT DOCUMENTS

| | | | |
|---|---|---|---|
| CH | 659792 | A5 | 2/1987 |
| CN | 1706598 | A | 12/2005 |

(Continued)

OTHER PUBLICATIONS

International Search Report of PCT/EP2020/079422, dated Jan. 18, 2021.

*Primary Examiner* — Robert F Long
(74) *Attorney, Agent, or Firm* — Davidson Kappel LLC

(57) ABSTRACT

Hammer drill and/or chipping hammer having a drive motor, an impact mechanism and a tool fitting for fitting a tool, wherein the impact mechanism has an anvil that is axially displaceable in an anvil guide and acts on the tool, wherein the impact mechanism has an idle-strike damper element and a rebound-strike damper element, which are formed in one piece with one another and as such form a combined damper element, wherein the anvil guide is arranged outside, preferably only outside the combined damper element.

21 Claims, 2 Drawing Sheets

(56) References Cited

U.S. PATENT DOCUMENTS

| | | | | |
|---|---|---|---|---|
| 9,079,286 | B1 * | 7/2015 | DeCamillis | B25D 17/08 |
| 2003/0098168 | A1 | 5/2003 | Frauhammer et al. | |
| 2004/0231869 | A1 * | 11/2004 | Bernhart | B25D 17/06 173/210 |
| 2005/0269117 | A1 | 12/2005 | Sato et al. | |
| 2006/0054333 | A1 | 3/2006 | Duesseldorf et al. | |
| 2006/0248701 | A1 * | 11/2006 | Bernhart | B25D 17/06 173/128 |
| 2008/0029283 | A1 | 2/2008 | Hammerstingl et al. | |
| 2008/0217040 | A1 | 9/2008 | Loeffler et al. | |
| 2008/0245220 | A1 * | 10/2008 | Duesselberg | B25D 17/24 91/234 |
| 2010/0294525 | A1 | 11/2010 | Meixner et al. | |
| 2011/0073339 | A1 | 3/2011 | Werner et al. | |
| 2011/0303431 | A1 * | 12/2011 | Hartmann | B25D 17/06 173/114 |
| 2012/0103643 | A1 * | 5/2012 | Binder | B25F 5/001 173/1 |
| 2012/0125650 | A1 * | 5/2012 | Koch | B25D 17/06 173/211 |
| 2012/0223491 | A1 | 9/2012 | Hauptmann et al. | |
| 2012/0267138 | A1 * | 10/2012 | Fuenfer | B21C 37/157 29/428 |
| 2012/0298393 | A1 * | 11/2012 | Hartmann | B25D 17/06 173/200 |
| 2016/0207188 | A1 | 7/2016 | Weber et al. | |
| 2016/0279778 | A1 | 9/2016 | Koch et al. | |
| 2017/0014983 | A1 * | 1/2017 | Hauptmann | B25D 11/005 |
| 2019/0118363 | A1 * | 4/2019 | Fuenfer | B25D 17/06 |
| 2019/0351538 | A1 | 11/2019 | Piras et al. | |
| 2022/0362916 | A1 * | 11/2022 | Fünfer | B25D 17/06 |
| 2022/0388137 | A1 * | 12/2022 | Mandel | B25D 11/005 |

FOREIGN PATENT DOCUMENTS

| | | | | |
|---|---|---|---|---|
| CN | 1748954 | A | 3/2006 | |
| CN | 102046334 | A | 5/2011 | |
| CN | 102672684 | A | 9/2012 | |
| CN | 104101422 | A | 10/2014 | |
| CN | 105555485 | A | 5/2016 | |
| CN | 105705300 | A | 6/2016 | |
| CN | 109982814 | A | 7/2019 | |
| DE | 10323606 | A1 * | 12/2004 | B25D 17/06 |
| DE | 102007048262 | A1 | 4/2009 | |
| DE | 102011079367 | A1 | 1/2013 | |
| EP | 0663270 | A1 | 7/1995 | |
| EP | 1479485 | A1 | 11/2004 | |
| EP | 2140982 | A1 | 1/2010 | |
| EP | 2199031 | A1 | 6/2010 | |
| EP | 2314420 | A1 | 4/2011 | |
| GB | 2039816 | A * | 8/1980 | B25D 11/125 |
| GB | 1587545 | A | 4/1981 | |
| NL | 7713509 | A | 6/1978 | |
| WO | WO 2015/000129 | A1 | 1/2015 | |
| WO | WO 2021/094213 | A1 | 5/2021 | |

* cited by examiner

IMPACT MECHANISM ARRANGEMENT

The present invention relates to a hammer drill and/or chipping hammer having a drive motor, an impact mechanism and a tool fitting for fitting a tool. The impact mechanism has an anvil that is axially displaceable in an anvil guide and acts on the tool. The impact mechanism is equipped with an idle-strike damper element and a rebound-strike damper element, which are formed in one piece with one another and form a combined damper element.

BACKGROUND

Hammer drills of the type mentioned at the beginning are known in principle from the prior art and described for example in EP 1 479 485 A1.

Idle-strike damper elements and rebound-strike damper elements, which are preferably in the form of elastomer damping elements, are used in order to keep force peaks on downstream components and vibrations as low as possible. When the impact mechanism is at the working point, the anvil butts, after each strike, against a typically provided rebound-strike disk and this is absorbed by the rebound-strike damping element.

SUMMARY OF THE INVENTION

In the event of too low a pressing force or the breaking away of concrete/stone to be worked on, idle strikes can occur. This means that strikes with full impact energy have to be absorbed by the hammer and in particular the tool fitting itself. In order to protect the downstream components from a force peak of the idle strike, use is typically made of an idle-strike damping element. Idle-strike damping by the idle-strike damper element influences the return speed of the anvil after an idle strike and thus also the deactivation behavior of the hammer.

It is an object of the present invention to provide a hammer drill and/or chipping hammer, the impact mechanism of which has a comparatively long service life and at the same time is easy to mount.

The present invention provides that the anvil guide is arranged outside, preferably only outside the combined damper element. The invention incorporates the finding that an anvil guide realized within the combined damper element, in particular when the combined damper element, as in the previously known prior art, itself forms a part of this anvil guide, promotes a considerable reduction in the service life of the combined damper element and thus of the entire impact mechanism. Since, according to the invention, the anvil guide is arranged outside, preferably only outside the combined damper element, this drawback is avoided.

In a particularly preferred embodiment, the anvil is formed in a cylindrical manner. The otherwise preferably cylindrically formed anvil may have a radial bead, which is arranged so as to strike the idle-strike damper element on one side and to strike the rebound-strike damper element on the other side. The combined damper element may have a central cutout, which extends along the entire length of the combined damper element. Preferably, the anvil is received at least partially within the central cutout and/or guided through the latter.

It has been found to be advantageous if the combined damper element has a cylindrical inner surface, which extends in the axial direction between an idle-strike stop surface and a rebound-strike stop surface. In a particularly preferred embodiment, a radial gap is provided between the cylindrical inner surface and the bead, preferably along the entire inner surface. Preferably, the radial gap is provided between the cylindrical inner surface and a thickest point of the bead, with respect to the radial direction.

It has been found to be advantageous if the combined damper element has a planar frontal stop surface, via which the combined damper element is supported on a shoulder of the tool fitting. Preferably, the frontal stop surface is formed in an annular manner and/or the frontal stop surface extends perpendicularly to the axial direction of the anvil.

In a particularly preferred embodiment, the combined damper element has a longitudinal slot. It has been found to be advantageous if the longitudinal slot extends axially along the combined damper element on the tool-fitting side. Preferably, the longitudinal slot serves for air exchange. As such, it is possible to avoid the anvil being drawn by negative pressure against the idle-strike stop surface or against the deactivation point located on the idle-strike stop surface. It has been found to be advantageous if, with the idle-strike damper element compressed, a residual opening remains of the longitudinal slot.

It has been found to be advantageous if the combined damper element consists of or exhibits an elastomer material. This has the advantage that the combined damper element can be fitted comparatively easily over the anvil during mounting of the impact mechanism. In a particularly preferred embodiment, the idle-strike damper element exhibits greater impact stiffness than the rebound-strike damper element.

In a particularly preferred embodiment, the combined damper element is formed by two half-shells. Preferably, a parting plane between the half-shells is oriented parallel to the axial direction of the anvil.

It has been found to be advantageous if the anvil guide has at least one plain bearing and/or at least one rolling bearing. Preferably, the anvil is guided or mounted by a plain bearing and/or at least one rolling bearing on both sides outside the combined damper element.

BRIEF DESCRIPTION OF THE DRAWINGS

Further advantages will become apparent from the following description of the figures. Various exemplary embodiments of the present invention are shown in the figures. The figures, the description and the claims contain numerous features in combination. A person skilled in the art will expediently also consider the features individually and combine them to form useful further combinations.

In the figures, identical and similar components are denoted by the same reference signs. In the figures:

FIGS. 3A and 2B show shows a second preferred exemplary embodiment of a combined damper element.

DETAILED DESCRIPTION

Figure 1:
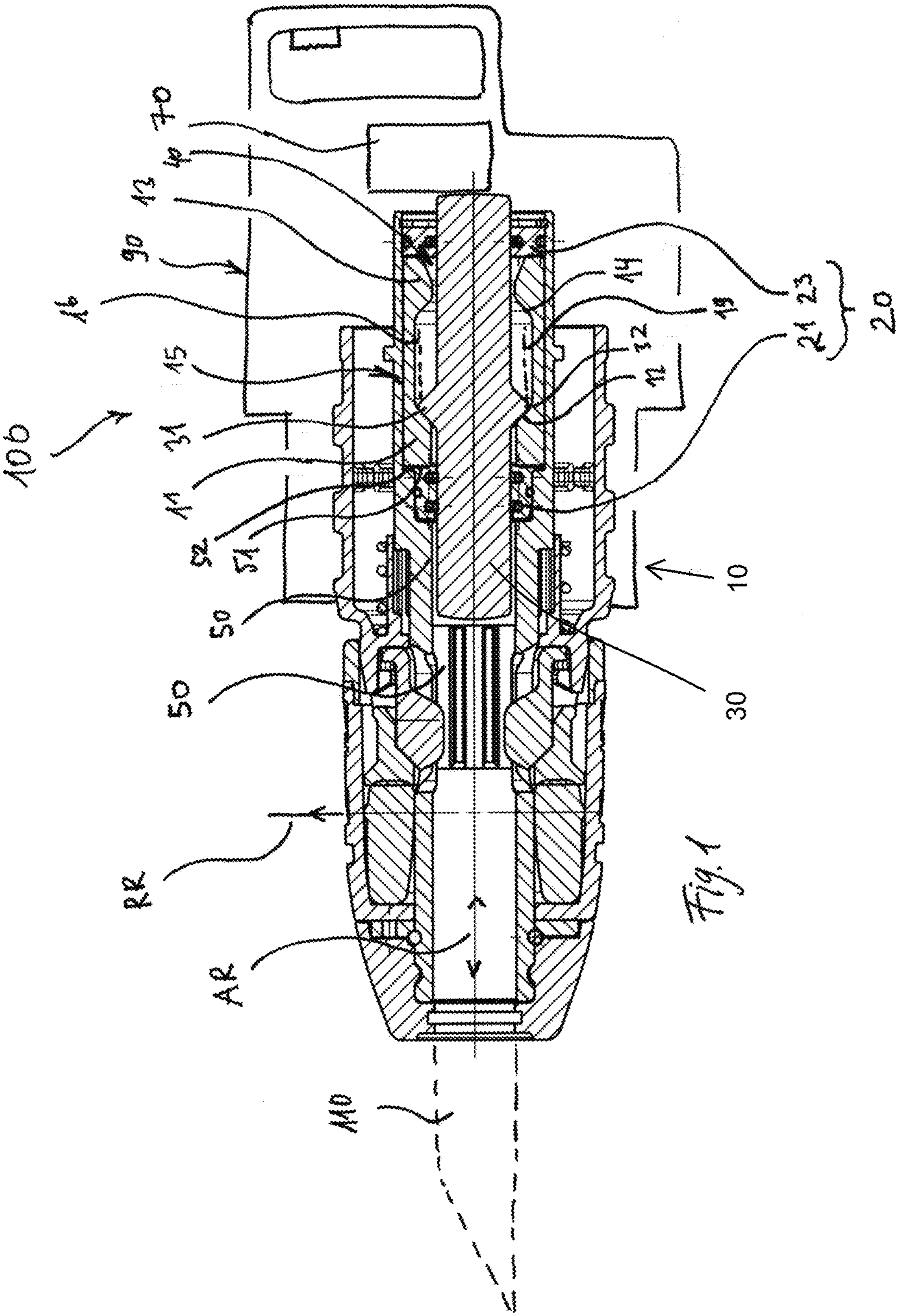
FIG. 1 shows a first preferred exemplary embodiment of a hammer drill and/or chipping hammer.

A preferred exemplary embodiment of a hammer drill and/or chipping hammer 100 according to the invention is illustrated in FIG. 1. The hammer drill and/or chipping hammer 100 is equipped with an electric drive motor 70, an impact mechanism 10 and a tool fitting 50 for fitting a tool 110. The impact mechanism 10, which is arranged in a housing 90, has an anvil 30 that is displaceable in the axial direction AR in an anvil guide 20 and acts on the tool 110.

The impact mechanism 10 has an idle-strike damper element 11 and a rebound-strike damper element 13. The idle-strike damper element 11 and the rebound-strike damper element 13 are formed in one piece with one another and as such form a combined damper element 15. The combined damper element 15 has a central cutout 40, which extends along the entire length L (cf. FIG. 2B) of the combined damper element 15. The anvil 30 is received at least partially within the central cutout 40 and guided through the latter.

As is apparent from FIG. 1, the anvil guide 20 has two rolling bearings 21, 23, which are arranged entirely outside the combined damper element 15. The anvil 30 is thus not mounted within the combined damper element 15 or by the combined damper element 15 itself.

The anvil 30 is formed in a cylindrical manner and has a radial bead 31 approximately in the middle. The radial bead 31 is arranged so as to strike the idle-strike damper element 11 on one side (left-hand side in FIG. 1) and to strike the rebound-strike damper element 13 on the other side (right-hand side in FIG. 1).

The combined damper element 15 has a cylindrical inner surface 16, which extends in the axial direction AR between an idle-strike stop surface 12 of the idle-strike damper element 11 and a rebound-strike stop surface 14 of the rebound-strike damper element 13. In other words, the cylindrical inner surface 16 is bounded on one side by the incipient idle-strike stop surface 12 and on the other side by the incipient rebound-strike stop surface 14, in each case as seen in the axial direction AR. Provided between the cylindrical inner surface 16 and the bead 31, to be more precise between the cylindrical inner surface 16 and the thickest point 32, in the radial direction RR, of the bead 31, is a radial gap 19 (particularly readily apparent in FIG. 2B, too). The radial gap 19 extends along the entire inner surface 16, i.e. at no point between the idle-strike stop surface 12 and the rebound-strike stop surface 14 is the thickest point 32 of the bead 31 in contact with the cylindrical inner surface 16 of the combined damper element 15. Therefore, undesired abrasion of the combined damper element 15 is effectively avoided.

Figure 2A:
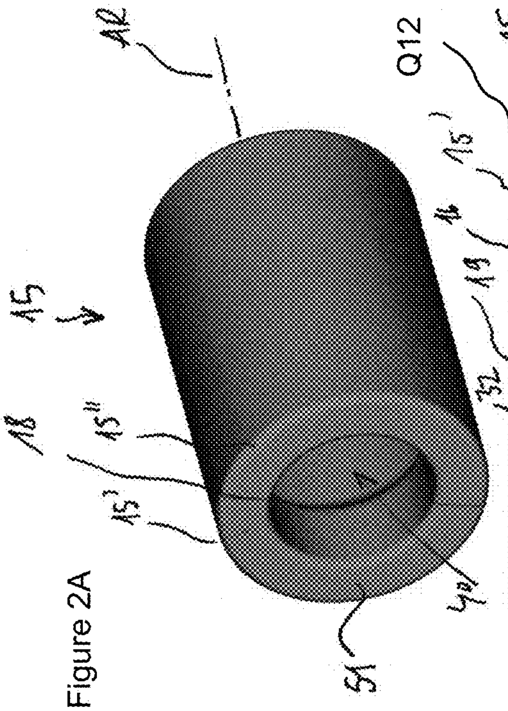
FIGS. 2A and 2B show a first preferred exemplary embodiment of a combined damper element.
Figure 2B:
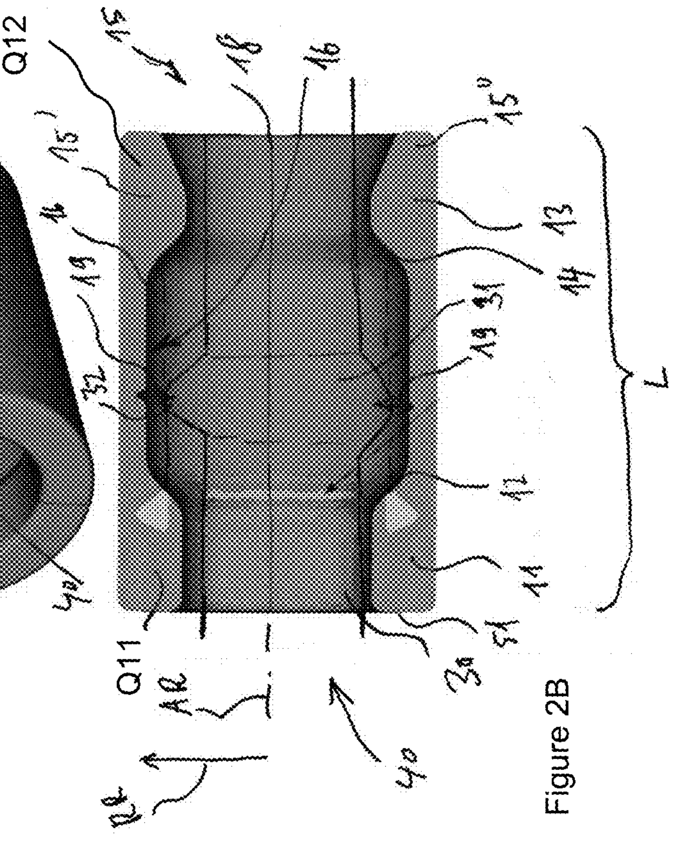

FIGS. 2A and 2B show a first preferred exemplary embodiment of a combined damper element 15, as can be used for example in the hammer drill and/or chipping hammer 100 in FIG. 1. FIG. 2A shows the combined damper element 15 as seen from the tool fitting 50. It is readily apparent that the combined damper element 15 has a planar frontal stop surface 51, via which the combined damper element 15 is supported on a shoulder 52 (cf. also FIG. 1) of the tool fitting 50.

The combined damper element 15 in FIG. 2A consists for example of an elastomer material and is formed by two half-shells 15', 15", which make mounting easier. A parting plane 18 between the half-shells 15', 15" extends parallel to the axial direction AR.

FIG. 2B shows a section through the combined damper element 15 along the parting plane 18. The central cutout 40, which is bounded by the annular, planar frontal stop surface 51, is readily apparent in FIG. 2A. The central cutout 40 extends along the entire length L of the combined damper element 15. The anvil 30 (schematically indicated here) is received at least partially within the central cutout 40. Provided between the cylindrical inner surface 16 and the bead 31, to be more precise between the cylindrical inner surface 16 and the thickest point 32, in the radial direction RR, of the bead 31, is the above-described radial gap 19.

In the combined damper element 15 in FIG. 2B, the idle-strike damper element 11 exhibits greater impact stiffness than the rebound-strike damper element 13. This is achieved by structural design solely in that—with respect to the axial direction AR—"extra" elastomer material is used in the idle-strike damper element 11 compared with the rebound-strike damper element 13. If the idle-strike damper element 11 has more of a cylindrical ring-shaped cross section Q11, a cross section Q12 of the rebound-strike damper element 13 widens in the manner of a diffuser (to the right in FIG. 2B).

Figure 3A:
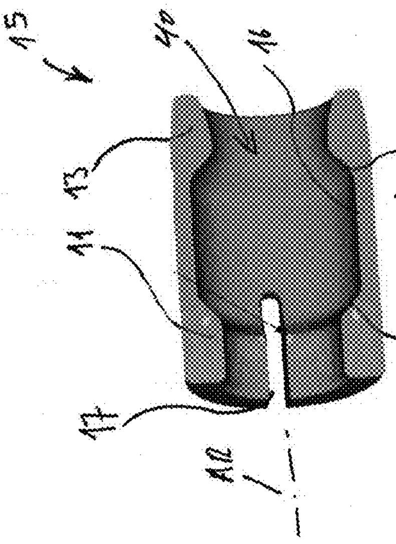
Figure 3B:
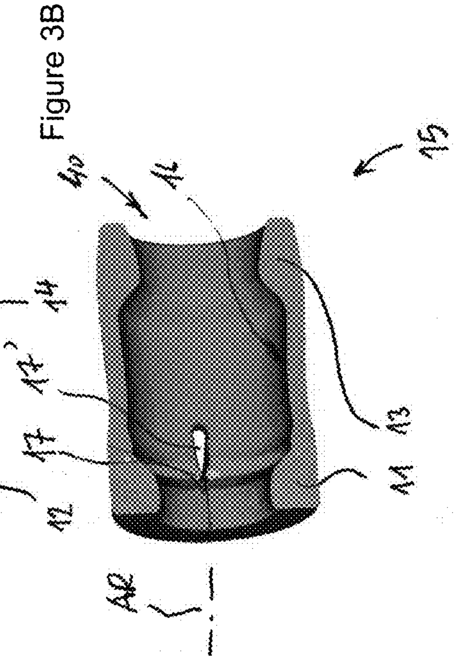

A second preferred exemplary embodiment of a combined damper element 15 is illustrated in FIGS. 3A and 3B. In addition to the exemplary embodiment illustrated in FIGS. 2A and 2B, in the case of the combined damper element 15 in FIGS. 3A and 3B, a longitudinal slot 17 is provided, which extends axially along the combined damper element 15 (from the left-hand side in FIG. 3A) on the tool-fitting side. The longitudinal slot 17 ensures air exchange so as to avoid the anvil being drawn by negative pressure against the idle-strike stop surface 12. FIG. 3A shows the combined damper element 15 in a relaxed state, i.e. the anvil is, as can be seen for example in FIG. 2B, in a central position. In FIG. 3B, the combined damper element 15, to be more precise the idle-strike damper element 11, is shown in the compressed state. Of the longitudinal slot 17 there remains a residual opening 17', via which air exchange is possible even in the case of a compressed idle-strike damper element 11.

LIST OF REFERENCE SIGNS

10 Impact mechanism
11 Idle-strike damper element
12 Idle-strike stop surface
13 Rebound-strike damper element
14 Rebound-strike stop surface
15 Combined damper element
15', 15" Half-shells
16 Cylindrical inner surface
17 Longitudinal slot
17' Residual opening
18 Parting plane
19 Radial gap
20 Anvil guide
21, 23 Rolling bearing
30 Anvil
31 Radial bead
32 Thickest point
40 Central cutout
50 Tool fitting
51 Planar frontal stop surface
52 Shoulder
70 Drive motor
90 Housing
100 Hammer drill and/or chipping hammer
110 Tool
AR Axial direction
RR Radial direction
Q11, Q12 Cross sections

What is claimed is:

1. A hammer drill or chipping hammer comprising:

a drive motor;

an impact mechanism; and a tool fitting for fitting a tool, wherein the impact mechanism has an anvil axially displaceable in an anvil guide and acting on the tool, wherein the impact mechanism has an idle-strike damper element and a rebound-strike damper element formed in one piece with one another to define a combined damper element, the anvil guide being arranged outside the combined damper element;

wherein the anvil guide has two bearings and the combined damper element is located axially between the two bearings.

2. The hammer drill or chipping hammer as recited in claim 1 wherein the anvil guide is arranged exclusively outside the combined damper element.

3. The hammer drill or chipping hammer as recited in claim 1 wherein the anvil has a radial bead arranged so as to strike the idle-strike damper element on one side and to strike the rebound-strike damper element on an other side.

4. The hammer drill or chipping hammer as recited in claim 3 wherein anvil is cylindrically formed apart from the radial bead.

5. The hammer drill or chipping hammer as recited in claim 3 wherein the combined damper element has a cylindrical inner surface extending in an axial direction between an idle-strike stop surface and a rebound-strike stop surface, wherein a radial gap is provided between the cylindrical inner surface and the bead.

6. The hammer drill or chipping hammer as recited in claim 5 wherein the radial gap extends along an entirety of the inner surface.

7. The hammer drill or chipping hammer as recited in claim 1 wherein the combined damper element has a planar frontal stop surface, via which the combined damper element is supported on a shoulder of the tool fitting.

8. The hammer drill or chipping hammer as recited in claim 1 wherein the combined damper element has a longitudinal slot extending axially along the combined damper element on the tool-fitting side.

9. The hammer drill or chipping hammer as recited in claim 8 wherein when the idle-strike damper element is compressed, a residual opening remains of the longitudinal slot.

10. The hammer drill or chipping hammer as recited in claim 1 wherein the combined damper element consists of or exhibits an elastomer material.

11. The hammer drill or chipping hammer as recited in claim 1 wherein the idle-strike damper element exhibits greater impact stiffness than the rebound-strike damper element.

12. The hammer drill or chipping hammer as recited in claim 1 wherein the combined damper element is formed by two half-shells.

13. The hammer drill or chipping hammer as recited in claim 12 wherein a parting plane between the two half-shells is oriented parallel to the axial direction of the anvil.

14. The hammer drill or chipping hammer as recited in claim 1 wherein the bearings are plain or roller bearings.

15. The hammer drill or chipping hammer as recited in claim 1 wherein the bearings are roller bearings.

16. The hammer drill or chipping hammer as recited in claim 1 wherein the anvil is axially moveably supported by the two bearings between the idle-strike damper element and the rebound-strike damper element.

17. The hammer drill or chipping hammer as recited in claim 16 wherein the anvil is spaced from contact with the combined damper element when in an intermediate position between the idle-strike damper element and the rebound-strike damper element.

18. The hammer drill or chipping hammer as recited in claim 15 wherein anvil is supported axially moveably solely by the two bearings.

19. The hammer drill or chipping hammer as recited in claim 1 wherein the anvil has an outer surface spaced from contact with the combined damper element except at an idle-strike stop surface of the idle-strike damper element and a rebound-strike stop surface of the idle-strike damper element.

20. A hammer drill or chipping hammer comprising:

a drive motor;

an impact mechanism; and a tool fitting for fitting a tool, wherein the impact mechanism has an anvil axially displaceable in an anvil guide and acting on the tool, wherein the impact mechanism has an idle-strike damper element and a rebound-strike damper element formed in one piece with one another to define a combined damper element, the anvil guide being arranged outside the combined damper element; wherein the anvil guide has two bearings and the anvil is supported axially moveably solely by the two bearings.

21. A hammer drill or chipping hammer comprising:

a drive motor;

an impact mechanism; and a tool fitting for fitting a tool, wherein the impact mechanism has an anvil axially displaceable in an anvil guide and acting on the tool, wherein the impact mechanism has an idle-strike damper element and a rebound-strike damper element formed in one piece with one another to define a combined damper element, the anvil guide being arranged outside the combined damper element;

wherein the anvil guide has two bearings and the anvil is axially moveably supported by the two bearings between the idle-strike damper element and the rebound-strike damper element.

* * * * *